(12) United States Patent
Umeya

(10) Patent No.: US 6,693,686 B2
(45) Date of Patent: Feb. 17, 2004

(54) POLARIZING ELEMENT AND OPTICAL DISPLAY APPARATUS INCLUDING THE SAME

(75) Inventor: Masanori Umeya, Shinjuku-ku (JP)

(73) Assignee: Ai Nippon Printing Co., Ltd. (JP)

( * ) Notice: Subject to any disclaimer, the term of this patent is extended or adjusted under 35 U.S.C. 154(b) by 0 days.

(21) Appl. No.: 10/200,751

(22) Filed: Jul. 24, 2002

(65) Prior Publication Data

US 2003/0043339 A1 Mar. 6, 2003

(30) Foreign Application Priority Data

Aug. 7, 2001 (JP) ........................................ 2001-239828

(51) Int. Cl.$^7$ ................... G02F 1/1335; G02F 1/13; C09K 19/02
(52) U.S. Cl. ........................ 349/98; 349/175; 349/185
(58) Field of Search ............................ 349/98, 175, 185

(56) References Cited

U.S. PATENT DOCUMENTS 5,999,240 A * 12/1999 Sharp et al. ................ 349/119
6,057,961 A *  5/2000 Allen et al. ................ 359/494
6,169,708 B1 *  1/2001 Kaneko et al. ............... 349/86

FOREIGN PATENT DOCUMENTS

| EP | 0 862 076 A1 | 9/1998 |
| EP | 1 004 924 A1 | 5/2000 |
| WO | WO 01/20394 A1 | 3/2001 |

* cited by examiner

Primary Examiner—Julie Ngo
(74) Attorney, Agent, or Firm—Parkhurst & Wendel, L.L.P.

(57) ABSTRACT

A polarizing element 20 includes a cholesteric layer 21 that selectively reflects either one of right-handed and left-handed circularly polarized components of incident light, and an absorptive elliptical polarizing plate 22 that is laminated to the cholesteric layer 21. The polarizing plate 22 transmits elliptically polarized light that contains as its main component the circularly polarized component having the direction of optical rotation that is identical to that of the circularly polarized component selectively reflected by the cholesteric layer 21. In this polarizing element 20, the angle (angle of lamination) which the direction of the major axes of liquid crystalline molecules aligned on the absorptive-elliptical-polarizing-plate-side surface of the cholesteric layer 21, d1, forms with the direction of the major axis of elliptically polarized light produced by the absorptive elliptical polarizing plate 22, d2, falls in a specified angle range centering around 90°.

15 Claims, 5 Drawing Sheets

POLARIZING ELEMENT AND OPTICAL DISPLAY APPARATUS INCLUDING THE SAME

BACKGROUND OF THE INVENTION

1. Field of the Invention

The present invention relates to a polarizing element for use in an optical display apparatus such as a transmission-reflection-type liquid crystal display. In particular, the present invention relates to a polarizing element adapted to enhance contrast so as to provide improved displaying quality to an optical display apparatus, and to an optical display apparatus including such a polarizing element.

2. Description of Related Art

A transmission-reflection-type liquid crystal display has conventionally been known as a liquid crystal display that can be used with extraneous light in a reflection mode and with a backlight in a transmission mode. A semi-transmission reflector is usually used in such a transmission-reflection-type liquid crystal display as a reflecting plate for reflecting extraneous light. This semi-transmission reflector reflects extraneous light when the display is used in a reflection mode, and, when the display is used in a transmission mode, transmits a backlight emitted from a surface light source provided at its rear.

In recent years, a layer having a cholesteric regularity (cholesteric layer) has come into use as the above-described semi-transmission reflector. A cholesteric layer has the property of selecting polarized light (the property of separating polarized light), by which incident light is separated into a component circularly polarized in one direction and a component circularly polarized in the opposite direction, on the basis of the physical arrangement (planar arrangement) of molecules in the cholesteric layer. Light entering into the cholesteric layer along the helical axis of the planar arrangement is split into a right-handed polarized component and a left-handed polarized component, and the cholesteric layer reflects one of these circularly polarized components and transmits the other one. This phenomenon is widely known as dichroism. If the direction of optical rotation of a circularly polarized component is properly selected in terms of incident light, a component circularly polarized in the same direction as that of the helical axis of the cholesteric structure of a cholesteric layer is selectively reflected or transmitted.

In the case where a cholesteric layer is used in a display as the semi-transmission reflector, a circular polarizing plate (elliptical polarizing plate) is provided at the rear of the cholesteric layer, i.e., on the surface light source side, so that light that passes through the cholesteric layer when the display is used in a reflection mode, in which extraneous light is used, will not return to the observer side. (Please note that there are no real circular polarizing plates that can produce a completely circular state of polarization in a practical level; and thus, all circular polarizing plates that cannot produce a completely circular state of polarization, including those polarizing plates, that are conventionally called circular polarizing plates, are referred to as "elliptical polarizing plates" in this specification.)

FIGS. 8A and 8B are schematic views illustrating the operation of a transmission-reflection-type liquid crystal display, and correspond to a transmission mode and a reflection mode, respectively.

As shown in FIGS. 8A and 8B, the cholesteric layer for use in a transmission-reflection-type liquid crystal display has the properties of not perfectly (100%) reflecting a specific circularly polarized component of visible light but transmitting this component to some extent. The ratio of transmission to reflection may be established so that it falls in the range of 95:5 to 5:95.

Specifically, when the display is used in a transmission mode, the cholesteric layer reflects a part (L3) of the right-handed circularly polarized light (L2) and transmits the remainder (L1) of the same, as shown in FIG. 8A. On the other hand, when the display is used in a reflection mode, the cholesteric layer reflects a part (L3) of the right-handed circularly polarized light (L2) and transmits the remainder (L1) of the same, as shown in FIG. 8B.

In general, however, the aforementioned conventional liquid crystal display of transmission-reflection type has such a problem that contrast in a transmission mode (see FIG. 8A), in which a backlight is used, is low. Therefore, there have been strong demands for elucidation of the cause of this problem and improvement in contrast.

To meet these demands, the inventor has made earnest studies, and, as a result, has found that contrast in the transmission-reflection-type liquid crystal display depends largely upon how the cholesteric layer and the elliptical polarizing plate, which is provided on the surface of the backlight unit, are laminated to each other. In particular, if the state of polarization before and after the cholesteric layer (L2, L1) is disordered in a transmission mode (see FIG. 8A), the right-handed circularly polarized light is not fully extinguished by a right elliptical polarizing plate, which is provided on the observer side, when a liquid crystal displaying element is switched on; and light leakage thus occurs to lower the quality of black indication.

SUMMARY OF THE INVENTION

The present invention was accomplished on the basis of the above-described finding. An object of the present invention is to provide a polarizing element adapted to enhance contrast so as to attain improvement in the displaying quality of an optical display apparatus, and an optical display apparatus including such a polarizing element.

A first aspect of the present invention is a polarizing element comprising a cholesteric layer that selectively reflects either one of right-handed and left-handed circularly polarized components of incident light; and an absorptive elliptical polarizing plate that is laminated to the cholesteric layer. The polarizing plate transmits elliptically polarized light that contains as its main component the circularly polarized component having the direction of optical rotation that is identical to that of the circularly polarized component selectively reflected by the cholesteric layer. The cholesteric layer and the absorptive elliptical polarizing plate are laminated to each other so that the direction of the major axes of liquid crystalline molecules aligned on the absorptive-elliptical-polarizing-plate-side surface of the cholesteric layer can form, with the direction of the major axis of elliptically polarized light produced by the absorptive elliptical polarizing plate, an angle that falls in a specified angle range centering around 90°.

A second aspect of the present invention is an optical display apparatus comprising a displaying element for displaying an image by modulating light; a surface light source provided on the back side of the displaying element; and a polarizing element provided between the displaying element and the surface light source. The polarizing element includes a cholesteric layer that selectively reflects either one of right-handed and left-handed circularly polarized components of incident light emitted from the surface light source; and an absorptive elliptical polarizing plate that is laminated to the cholesteric layer and that transmits elliptically polarized light that contains as its main component the circularly polarized component having the direction of optical rotation that is identical to that of the circularly polarized component selectively reflected by the cholesteric layer. The cholesteric layer and the absorptive elliptical polarizing plate being laminated to each other so that the direction of the major axes of liquid crystalline molecules aligned on the absorptive-elliptical-polarizing-plate-side surface of the cholesteric layer can form, with the direction of the major axis of elliptically polarized light produced by the absorptive elliptical polarizing plate, an angle that falls in a specified angle range centering around 90°.

In the above-described first and second aspect, it is preferable that the absorptive elliptical polarizing plate be composed of a retardation layer provided on the cholesteric layer, and a linear polarizing layer provided on the opposite side of this retardation layer from the cholesteric layer. It is also preferable that the specified angle range be 90°±22.5°, more preferably 90°±150°. Further, the cholesteric layer and the absorptive elliptical polarizing plate may be laminated to each other either directly or through an isotropic intermediate layer. Preferably, the refractive index of this intermediate layer is intermediate between the refractive index of the cholesteric layer and that of the absorptive elliptical polarizing plate.

According to the present invention, the cholesteric layer that selectively reflects either one of right-handed and left-handed circularly polarized components of incident light, and the absorptive elliptical polarizing plate that transmits elliptically polarized light containing as its main component the same circularly polarized component as that selectively reflected by the cholesteric layer are laminated to each other, so that the direction of the major axes of liquid crystalline molecules aligned on the absorptive-elliptical-polarizing-plate-side surface of the cholesteric layer can form, with the direction of the major axis of elliptically polarized light produced by the absorptive elliptical polarizing plate, an angle that falls in a specified angle range centering around 90°. Therefore, of the main circularly polarized component of the elliptically polarized light produced by the absorptive elliptical polarizing plate, the circularly polarized component that has passed through the cholesteric layer by a certain percentage is effectively extinguished when it passes through the displaying element such as a liquid crystal displaying element and through the elliptical polarizing plate provided on the observer side, whereby the quality of black indication is improved. An optical display device in which such a polarizing element is incorporated can thus have enhanced contrast, and, as a result, improvement in displaying quality can successfully be attained.

DETAILED DESCRIPTION OF PREFERRED EMBODIMENTS

By referring to the accompanying drawings, embodiments of the present invention will be described hereinafter.

Figure 1A:
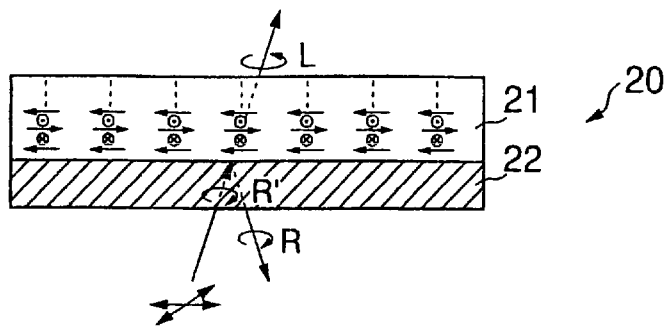
FIGS. 1A and 1B are diagrammatic views showing one embodiment of the polarizing element according to the present invention.
Figure 1B:
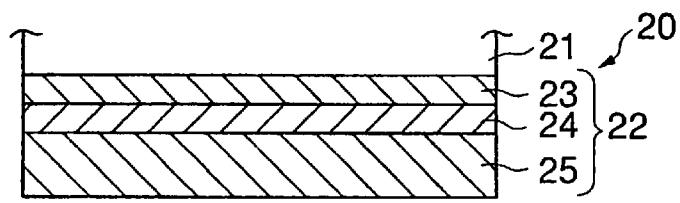

One embodiment of the polarizing element according to the present invention will firstly be described by referring to FIGS. 1A and 1B.

As shown in FIGS. 1A and 1B, a polarizing element 20 according to this embodiment includes a cholesteric layer 21 that selectively reflects either one of right-handed and left-handed circularly polarized components of incident light, and an absorptive elliptical polarizing plate 22 that is laminated to the cholesteric layer 21. The absorptive elliptical polarizing plate 22 transmits elliptically polarized light that contains as its main component the circularly polarized component having the direction of optical rotation that is identical to that of the circularly polarized component selectively reflected by the cholesteric layer 21.

As shown in FIG. 1B, the absorptive elliptical polarizing plate 22 is composed of retardation layers 23 and 24 provided on the cholesteric layer 21, and a linear polarizing layer 25 provided on the opposite side of the retardation layers 23 and 24 from the cholesteric layer 21, so that natural light entering from the linear polarizing layer 25 is elliptically polarized. The main circularly polarized component of the elliptically polarized light produced by the absorptive elliptical polarizing plate 22 should be identical with the circularly polarized component selectively reflected by the cholesteric layer 21. Therefore, for instance, a cholesteric layer 21 that reflects right-handed circularly polarized component R and transmits left-handed circularly polarized component L is used in combination with an absorptive elliptical polarizing plate 22 that produces right-handed elliptically polarized light R', as shown in FIG. 1A.

The cholesteric layer 21 has a structure having a cholesteric regularity in which cholesteric liquid crystalline molecules are arranged in helical fashion, and, as shown in FIG. 1A, those liquid crystalline molecules that exist on the absorptive-elliptical-polarizing-plate-side surface of the cholesteric layer 21 are aligned owing to the alignment-regulating action of an alignment layer or the like so that their major axes are oriented in substantially one direction. The arrow shown in the cholesteric layer 21 in FIG. 1A designates the direction of orientation (director) of molecules.

It is noted that the cholesteric liquid comprises a nematic liquid crystal and a chiral agent; and the nematic liquid crystal may be a chemical compound represented by any of the following chemical formulas.

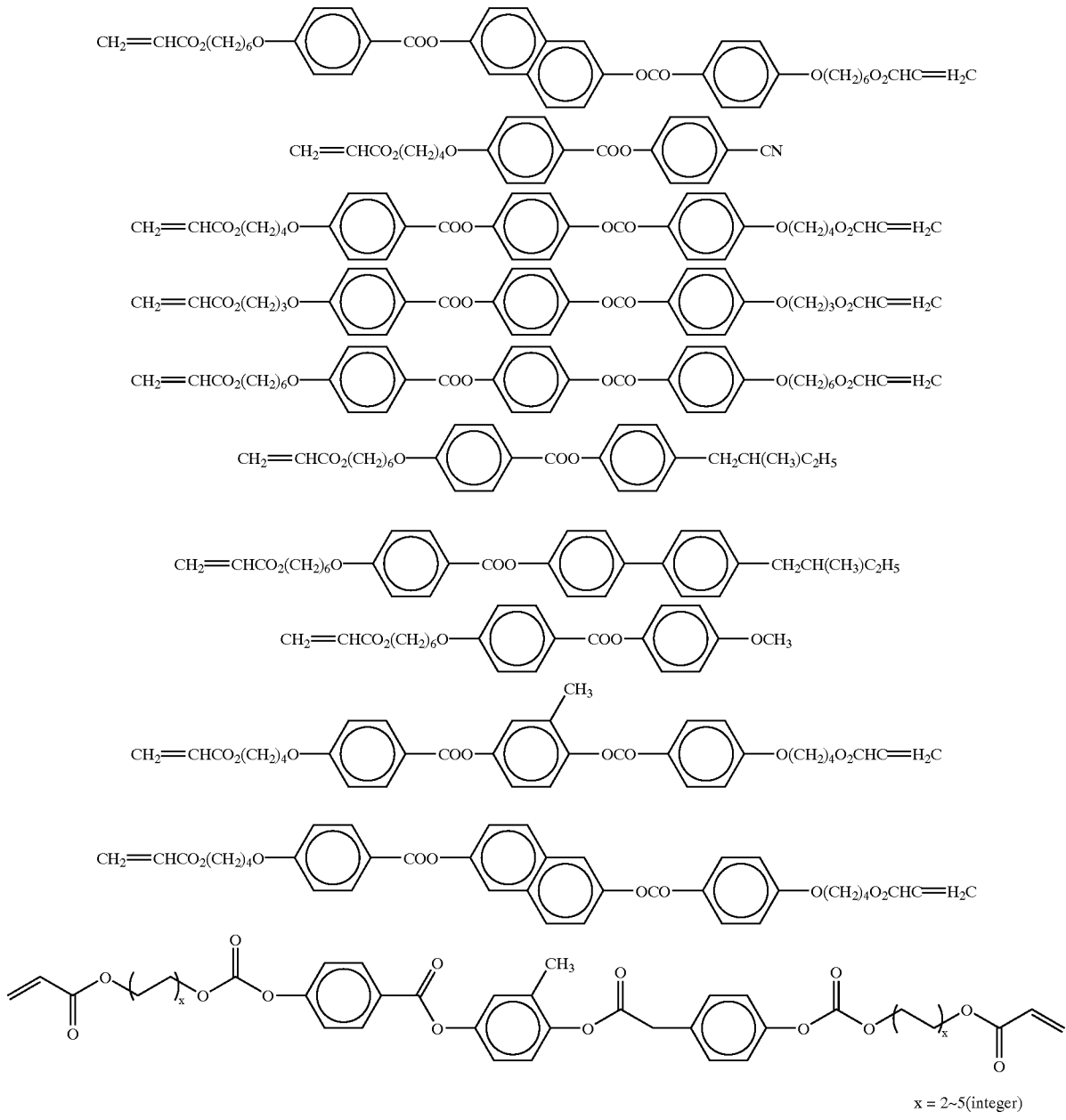
On the other hand, the chiral agent may be a chemical compound represented by the following formulas:
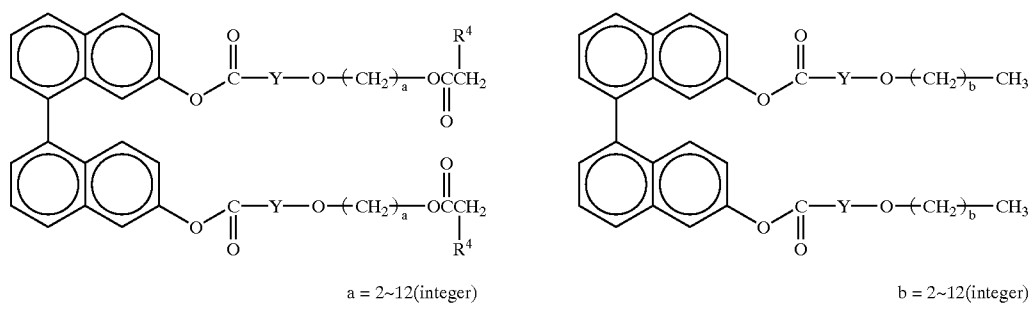

-continued

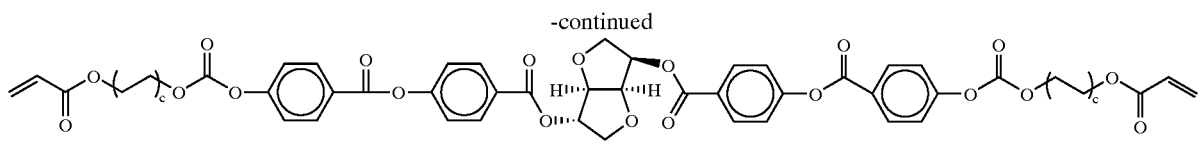

c = 2~5(integer)

Figure 2:
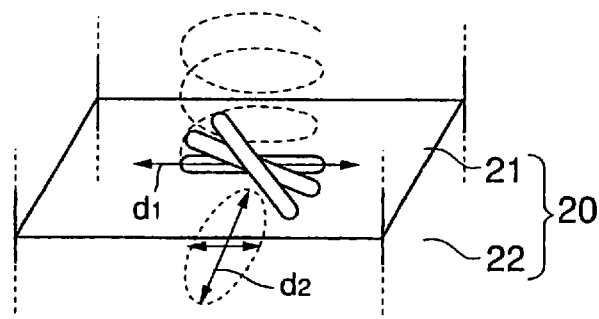
FIG. 2 is a schematic view illustrating the condition of lamination of the cholesteric layer and the absorptive elliptical polarizing plate in the polarizing element shown in FIGS. 1A and 1B.

Further, as shown in FIG. 2, the angle (angle of lamination) which the direction of the major axes of the liquid crystalline molecules aligned on the absorptive-elliptical-polarizing-plate-side surface of the cholesteric layer 21, d1, forms with the direction of the major axis of the elliptically polarized light produced by the absorptive elliptical polarizing plate 22, d2, falls in a specified angle range centering around 90°. The range of the angle of lamination is preferably 90°±22.5°; this is a range needed to enhance contrast (a range required to ensure 75% of the maximum contrast value). More preferably, the range of the angle of lamination is 90°±15°; this is a range required to ensure 90% of the maximum contrast value. The direction of the major axes of the liquid crystalline molecules aligned in substantially one direction in the cholesteric layer 21, d1, and that of the major axis of the elliptically polarized light produced by the absorptive elliptical polarizing plate 22, d2, may be taken as directors each having two opposite directions, and the angular relationship between the two directors may be discussed only within the range of 0° to 180°.

Figure 3:
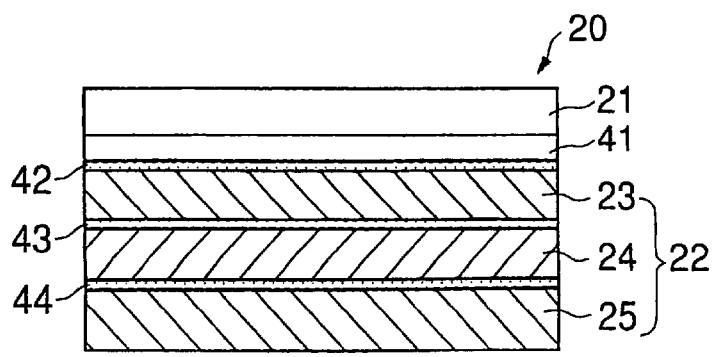
FIG. 3 is a diagrammatic view showing a variation of the polarizing element shown in FIGS. 1A and 1B.

The cholesteric layer 21 and the absorptive elliptical polarizing plate 22 may be laminated to each other either directly or, as shown in FIG. 3, through an isotropic intermediate layer such as a glass substrate 41 or an adhesive layer 42. Preferably, the refractive index of such an intermediate layer is made intermediate between the refractive index of the cholesteric layer 21 and that of the absorptive elliptical polarizing plate 22 so that reflection will not occur at the interface between each two layers. It is a matter of course that, also in the absorptive elliptical polarizing plate 22, adhesive layers 43 and 44 may be provided between the retardation layers 23 and 24, and between the retardation layer 24 and the linear polarizing layer 25, respectively, as shown in FIG. 3.

The cholesteric layer 21 may be either a single layer or a laminate of a plurality of films with different chiral pitches. Further, besides the absorptive elliptical polarizing plate 22 containing the two retardation layers, an absorptive elliptical polarizing plate containing a single retardation layer, or three or more retardation layers may also be used.

Next, one embodiment of the transmission-reflection-type liquid crystal display (optical display apparatus) including the polarizing element 20 as shown in FIGS. 1A and 1B will be described by referring to FIG. 4.

Figure 4:
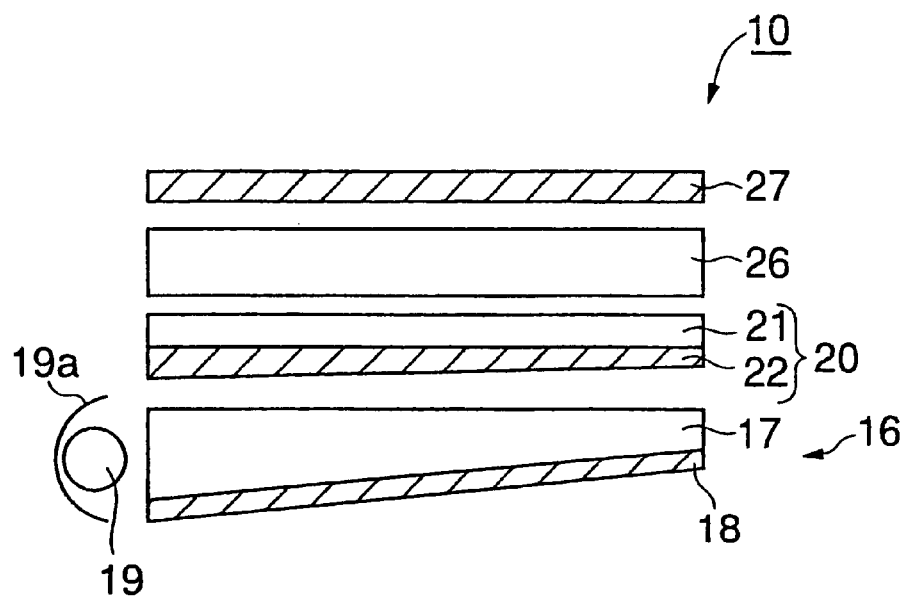
FIG. 4 is a diagrammatic cross-sectional view showing one embodiment of the transmission-reflection-type liquid crystal display (optical display apparatus) including the polarizing element according to the present invention.

As shown in FIG. 4, a transmission-reflection-type liquid crystal display 10 according to this embodiment includes a liquid crystal displaying element 26 for displaying an image by polarizing (modulating) light; a surface light source 16 provided on the back side of the liquid crystal displaying element 26; and a polarizing element 20 as shown in FIGS. 1A to 3, provided between the liquid crystal displaying element 26 and the surface light source 16. Further, an elliptical polarizing plate 27 is provided on the observer side of the liquid crystal displaying element 26. The surface light source 16 includes a light guide 17 that allows light that has entered from its sides to emerge from either its top or bottom; a light source 19 that emits light towards the sides of the light guide 17; and a reflector 18 that reflects light emerging from the bottom of the light guide 17. At the rear of the light source 19, a reflector 19a is provided.

Such a transmission-reflection-type liquid crystal display 10 displays, in a transmission mode, an image by making use of backlight emitted from the surface light source, which has passed through the polarizing element 20; while in a reflection mode, it displays an image by making use of extraneous light reflected by the polarizing element 20.

Thus, according to this embodiment, the cholesteric layer 21 that selectively reflects either one of right-handed and left-handed circularly polarized components of incident light, and the absorptive elliptical polarizing plate 22 that transmits elliptically polarized light containing as its main component the same circularly polarized component as that selectively reflected by the cholesteric layer 21 are laminated to each other, so that the direction of the major axes of liquid crystalline molecules aligned on the absorptive-elliptical-polarizing-plate-side surface of the cholesteric layer 21, d1, can form, with the direction of the major axis of elliptically polarized light produced by the absorptive elliptical polarizing plate 22, d2, an angle that falls in a specified angle range centering around 90°. Therefore, of the main circularly polarized component of the elliptically polarized light produced by the absorptive elliptical polarizing plate 22, the circularly polarized component that has passed through the cholesteric layer 21 by a certain percentage is effectively extinguished when it passes through the liquid crystal displaying element 26 and through the elliptical polarizing plate 27 provided on the observer side, whereby the quality of black indication is improved. An optical display device in which such a polarizing element is incorporated can thus have enhanced contrast, and, as a result, improvement in displaying quality can successfully be attained.

EXAMPLE

By referring now to FIGS. 5, 6 and 7, the aforementioned embodiments of the present invention will be explained more specifically.

To a cholesteric layer composed of a plurality of films, having the property of reflecting right-handed circularly polarized light and a wide selective reflection wave range (400 to 750 nm), an absorptive elliptical polarizing plate having a wide selective reflection wave range (400 to 750 nm) was laminated through an adhesive layer to obtain a polarizing element of the present invention. The cholesteric layer was formed by the use of a mixture of a nematic liquid crystalline monomer and a chiral nematic liquid crystalline monomer, which was solidified by photopolymerization. Specifically, a nematic liquid crystalline monomer having the following chemical formula (1):

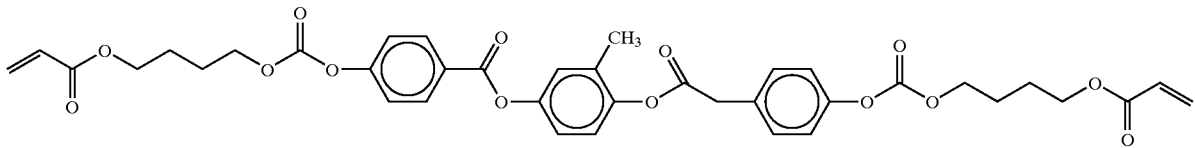

(1)

and a chiral nematic liquid crystalline monomer having the following chemical formula (2):

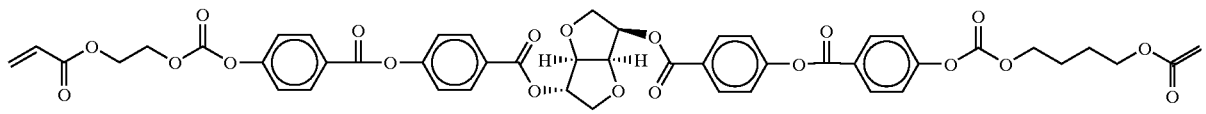

(2)

were mixed, provided that the mixing ratio was variously changed from 94:6 to 97:3, and the mixtures thus obtained were used to form a plurality of cholesteric films with different chiral pitches. The cholesteric films were herein laminated to form the cholesteric layer in ascending order in terms of reflection wavelength, the reflection wavelength of the cholesteric film firstly formed on the glass substrate being the shortest. For the elliptical polarizing plate, a linear polarizing film of pigment type combined with a ½ λ film and a ¼ λ film (the ellipticity at 450 to 650 nm was 90% or more) was used. To form the adhesive layer, an optical adhesive agent having a refractive index of approximately 1.5, for example, NOA65 or NOA68 manufactured by Norland Product Inc., U.S.A., was used.

Eight polarizing elements with the angles of lamination between the cholesteric layer and the absorptive elliptical polarizing plate of 0°, 30°, 60°, 75°, 90°, 105°, 120° and 180° were prepared as samples in the above-described manner.

Figure 5:
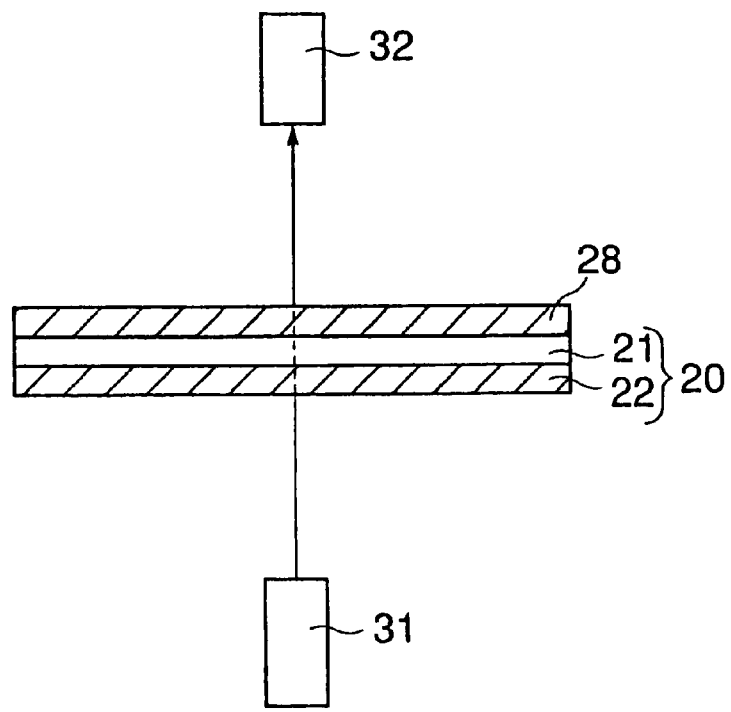
FIG. 5 is a diagrammatic view for explaining a method of a measurement used in Example.

These 8 samples were evaluated in terms of brightness (Y value) by the method of measurement as shown in FIG. 5 with visibility taken into consideration. Specifically, light (non-polarized light) emitted from the light source 31 was applied to each polarizing element 20, and the light emerging from the polarizing element 20 through the elliptical polarizing plate 28 was detected by a measuring apparatus 32. A halogen light source was used as the light source 31, and a goniophotometer manufactured by Apex Corporation was used as the measuring apparatus 32.

Each sample was subjected to two different types of measurement using (1) a right elliptical polarizing plate (Measurement Example 1) or (2) a left elliptical polarizing plate (Measurement Example 2) as the elliptical polarizing plate 28, which was laminated to the observer-side-surface (measuring-apparatus-side-surface) of the polarizing element 20.

In Measurement Example 1, the test sample was a combination of (right elliptical polarizing plate)→(cholesteric layer)→(right elliptical polarizing plate), and corresponded to the white indication state of an optical display apparatus. In Measurement Example 2, the test sample was a combination of (right elliptical polarizing plate)→(cholesteric layer)→(left elliptical polarizing plate), and corresponded to the black indication state of an optical display apparatus.

Therefore, when the method of measurement as shown in FIG. 5 is employed, it becomes possible to create a condition equivalent to that which the polarizing element 20 is incorporated in a transmission-reflection-type liquid crystal display. The contrast value of an optical display device in which the polarizing element 20 is incorporated can therefore be obtained by calculating the value of (Y value determined by Measurement Example 1)/(Y value determined by Measurement Example 2), i.e., the value of (Y value in the state of white indication)/(Y value in the state of black indication).

Figure 6:
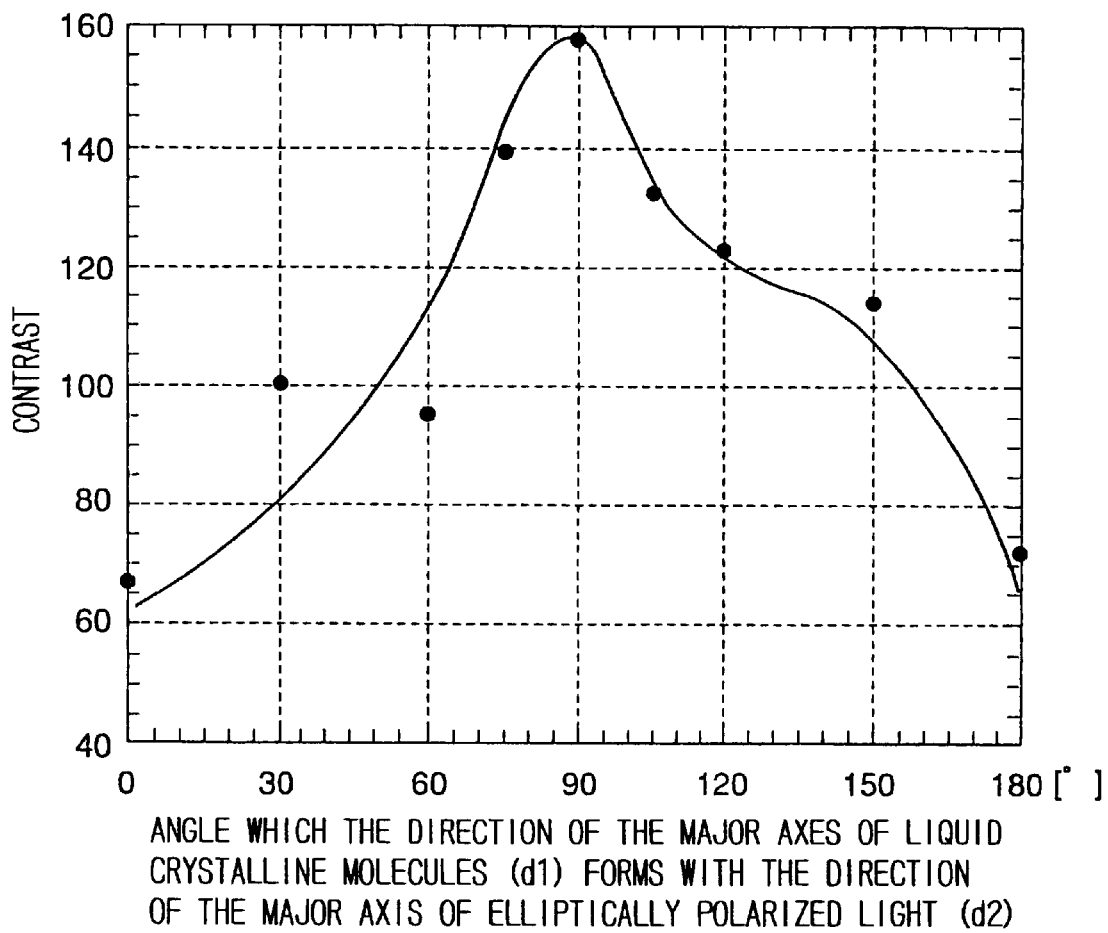
FIG. 6 is a graph showing the results of a measurement made in Example to determine contrast values.

FIG. 6 is a graph showing the results of the measurement made in this Example to determine contrast values.

In the case of a conventional optical display apparatus, one of the criteria for ascertaining that the display apparatus has good displaying quality is a contrast value of 120 or more. The results shown in FIG. 6 demonstrate that the polarizing elements with angles of lamination in the range of 90°±22.5° are satisfactory from this point of view. It can also known from the results shown in FIG. 6 that the polarizing elements with angles of lamination in the range of 90°±22.5° can ensure 75% of the maximum contrast value and that the polarizing elements with angles of lamination in the range of 90°±15° can ensure 90% of the maximum contrast value.

Figure 7:
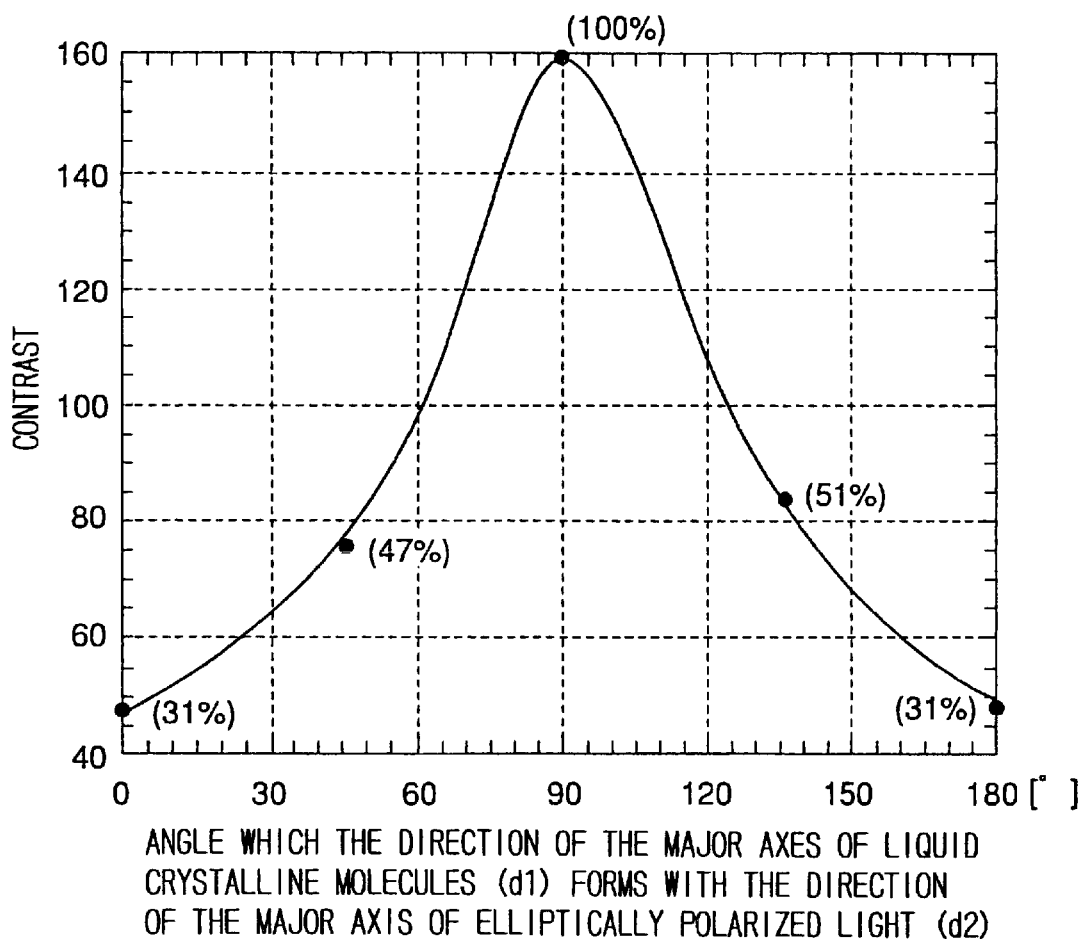
FIG. 7 is a graph showing the results of a computer simulation corresponding to the experiment carried out in Example.
Figure 8A:
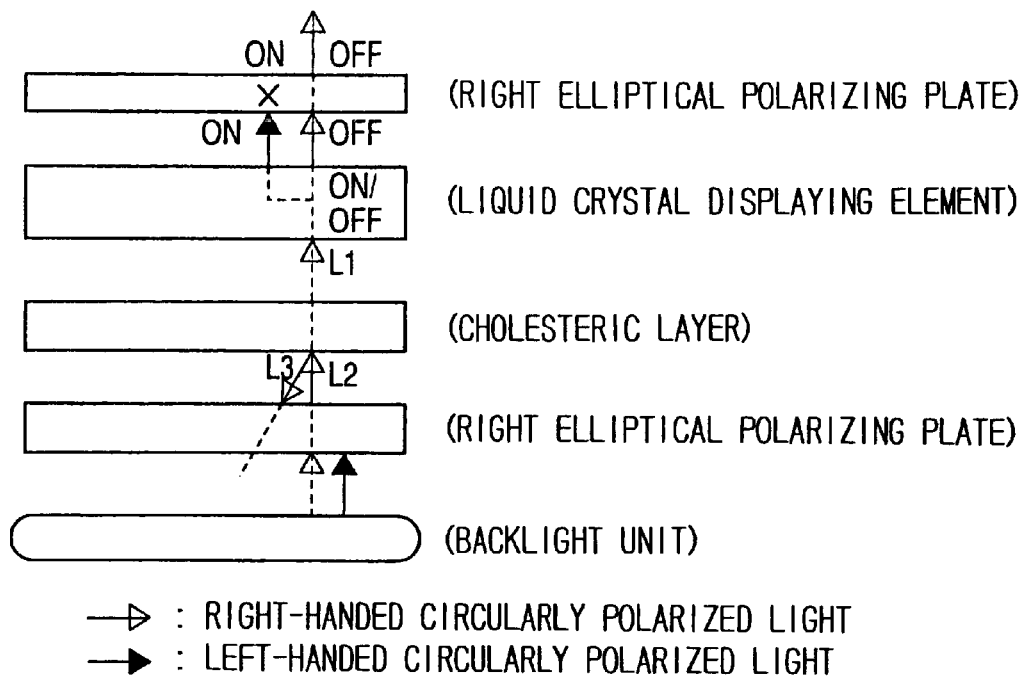
FIGS. 8A and 8B are schematic views illustrating the operation of a transmission-reflection-type liquid crystal display.
Figure 8B:
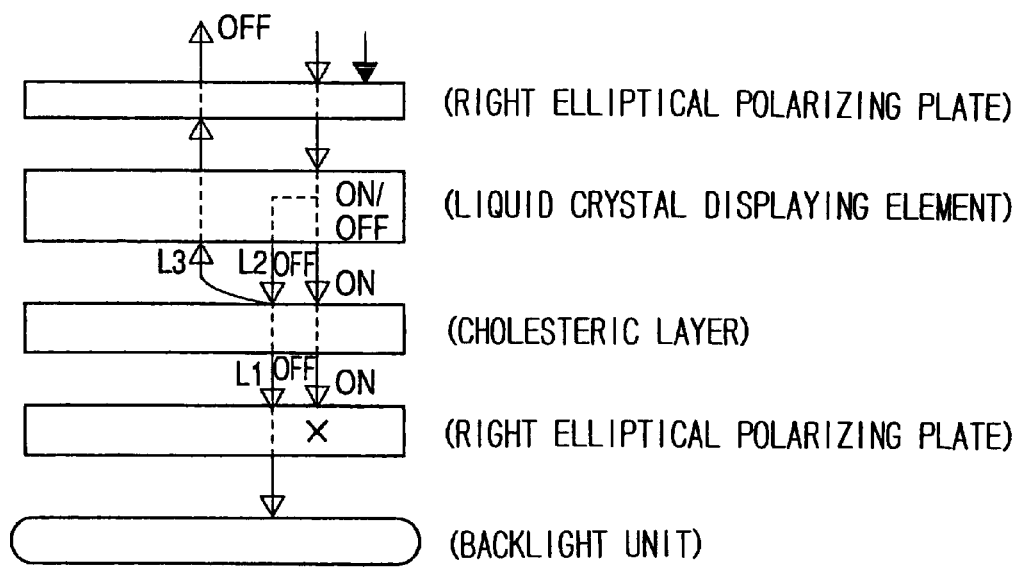

A computer simulation corresponding to the above-described experiment was conducted, and the results were as shown in FIG. 7. Used in this computer simulation was LCD Master (manufactured by Shintec Inc., Japan), a simulation soft usually used in the art. As is clear from FIG. 7, the results of this computer simulation were nearly equal to the results shown in FIG. 6.

What is claimed is:

1. A polarizing element comprising:
   a cholesteric layer selectively reflecting either one of right-handed and left-handed circularly polarized components of incident light; and
   an absorptive elliptical polarizing plate laminated to the cholesteric layer, the polarizing plate transmitting elliptically polarized light that contains as its main component a circularly polarized component having a direction of optical rotation that is identical to that of a circularly polarized component selectively reflected by the cholesteric layer,
   wherein the cholesteric layer and the absorptive elliptical polarizing plate are laminated to each other so that a direction of major axes of liquid crystalline molecules aligned on an absorptive-elliptical-polarizing-plate-side surface of the cholesteric layer can form, with a direction of a major axis of elliptically polarized light produced by the absorptive elliptical polarizing plate, an angle that falls in a specified angle range centering around 90°.

2. The polarizing element according to claim 1, wherein the absorptive elliptical polarizing plate includes a retardation layer provided on the cholesteric layer, and a linear polarizing layer provided on the opposite side of of the retardation layer from the cholesteric layer.

3. The polarizing element according to claim 1, wherein the specified angle range is 90°±22.5°.

4. The polarizing element according to claim 1, wherein the specified angle range is 90°±15°.

5. The polarizing element according to claim 1, wherein the cholesteric layer and the absorptive elliptical polarizing plate are laminated directly to each other.

6. The polarizing element according to claim 1, wherein the cholesteric layer and the absorptive elliptical polarizing plate are laminated to each other through an isotropic intermediate layer.

7. The polarizing element according to claim 6, wherein the intermediate layer has a refractive index that is intermediate between a refractive index of the cholesteric layer and that of the absorptive elliptical polarizing plate.

8. An optical display apparatus comprising:

a displaying element for displaying an image by modulating light;

a surface light source provided on a back side of the displaying element; and a polarizing element provided between the displaying element and the surface light source, wherein the polarizing element includes a cholesteric layer selectively reflecting either one of right-handed and left-handed circularly polarized components of incident light emitted from the surface light source; and an absorptive elliptical polarizing plate laminated to the cholesteric layer, the polarizing plate transmitting elliptically polarized light that contains as its main component a circularly polarized component having a direction of optical rotation that is identical to that of a circularly polarized component selectively reflected by the cholesteric layer, the cholesteric layer and the absorptive elliptical polarizing plate being laminated to each other so that a direction of major axes of liquid crystalline molecules aligned on an absorptive-elliptical-polarizing-plate-side surface of the cholesteric layer can form, with a direction of a major axis of elliptically polarized light produced by the absorptive elliptical polarizing plate, an angle that falls in a specified angle range centering around 90°.

9. The optical display apparatus according to claim 8, wherein the absorptive elliptical polarizing plate includes a retardation layer provided on the cholesteric layer, and a linear polarizing layer provided on the opposite side of the retardation layer from the cholesteric layer.

10. The optical display apparatus according to claim 8, wherein the specified angle range is 90°±22.5°.

11. The optical display apparatus according to claim 8, wherein the specified angle range is 90°±15°.

12. The optical display apparatus according to claim 8, wherein the cholesteric layer and the absorptive elliptical polarizing plate are laminated directly to each other.

13. The optical display apparatus according to claim 8, wherein the cholesteric layer and the absorptive elliptical polarizing plate are laminated to each other through an isotropic intermediate layer.

14. The optical display apparatus according to claim 13, wherein the intermediate layer has a refractive index that is intermediate between a refractive index of the cholesteric layer and that of the absorptive elliptical polarizing plate.

15. The optical display apparatus according to claim 8, wherein the displaying element is a liquid crystal display.

* * * * *

UNITED STATES PATENT AND TRADEMARK OFFICE
CERTIFICATE OF CORRECTION

PATENT NO. : 6,693,686 B2
DATED : February 17, 2004
INVENTOR(S) : Masanori Umeya It is certified that error appears in the above-identified patent and that said Letters Patent is hereby corrected as shown below:

<u>Title page,</u>
Item [73], Assignee, change "Ai Nippon Printing Co., Ltd." to -- Dai Nippon Printing Co., Ltd. --

Signed and Sealed this

Eleventh Day of May, 2004

JON W. DUDAS
*Acting Director of the United States Patent and Trademark Office*